Dec. 30, 1969     G. E. MORGAN     3,487,417

CONSTRUCTION FOR ABSORBING ENERGY

Filed May 22, 1968     2 Sheets-Sheet 2

United States Patent Office 3,487,417
Patented Dec. 30, 1969

3,487,417
CONSTRUCTION FOR ABSORBING ENERGY
Gerard E. Morgan, Lake Forest, Ill., assignor to Riddell,
Inc., Des Plaines, Ill., a corporation of Illinois
Filed May 22, 1968, Ser. No. 731,044
Int. Cl. A42b 1/08; F16f 13/00
U.S. Cl. 2—3                                    8 Claims

ABSTRACT OF THE DISCLOSURE

An energy absorbing construction which includes an enlarged fluid holding reservoir and a separate reservoir interconnected to the fluid holding reservoir through a relatively narrow passage means. Upon application of force to the main reservoir, the fluid will begin to flow to the other reservoir through the passage means with consequent absorption of energy. A restricting device is associated with the passage means so that the flow of fluid through the passage means will be regulated depending upon the magnitude of the force applied. The restricting means is connected to the first reservoir so that a portion of the fluid in the first reservoir will operate the restricting construction highly suitable for absorbing energy means and thereby constricting the opening through the passage means.

---

This invention relates to an improved energy absorbing construction highly suitable for absorbing energy resulting from the application of impact forces. The energy absorbing construction is particularly suitable for use in conjunction with protective equipment, for example, equipment worn by athletes or equipment otherwise used to prevent injury when a person encounters another object at a high relative speed.

A wide variety of structures have been designed for absorbing energy since individuals in certain situations are susceptible to impact forces which could result in serious injuries. For example, football players are provided with helmets which include suspension means designed to maintain the head of the wearer out of contact with the exterior shell. When an impact takes place, the suspension means will yield to a degree which will absorb and dissipate the force of the impact without permitting contact of the wearer's head with the hard shell. Impact protection is also provided to meet other situations, for example, where padding is provided for automobiles.

Prior art constructions are generally suitable for absorbing energy resulting from impact where the impact forces are not unduly severe. It has been found, however, that if the energy absorbing devices are suitable for relatively low impact forces, they will not effectively absorb energy resulting from more severe impact. Similarly, if the devices are designed for higher impact, they provide undue resistance in the case of lower impact forces. This is undesirable in the case of helmets, for example, since insufficient give is available when lighter blows are encountered which might result in injury, and since the helmet will be uncomfortable to wear.

It is an object of this invention to provide a novel energy absorbing device which provides certain improvements when compared with suspension means, padding or other prior art energy absorbing devices.

It is a further object of this invention to provide energy absorbing devices which can be associated with helmets, used as padding, or located in other arrangements whereby maximum energy absorption can be achieved.

It is a still further object of this invention to provide a device for absorbing energy which is characterized by a differential action depending upon the magnitude of the impact force.

These and other objects of this invention will appear hereinafter and for purposes of illustration, but not of limitation, specific embodiments of the invention are shown in the accompanying drawings in which.

The constructions of this invention generally comprise a first reservoir for holding a fluid and a second reservoir for receiving fluid transferred from the first reservoir as a result of the application of impact forces. A passage extends between the two reservoirs for transmittal of the fluid, and the specific improvement of the invention relates to restricting means to be employed for purposes of controlling the rate of movement of the fluid through the passage.

The restricting means operate to vary the size of the opening through the passage means. A connection is provided between the first reservoir and the restricting means so that the restricting means will operate in response to impact forces delivered to the first reservoir. The response is such that a highly effective resistance is provided against very high impact forces while suitable resistance which is characteristic of current constructions is provided for the low range of impact forces. Thus, the invention makes separate provision for high impact forces rather than depending upon the same system which is most suitable for low impact forces.

Figure 1:
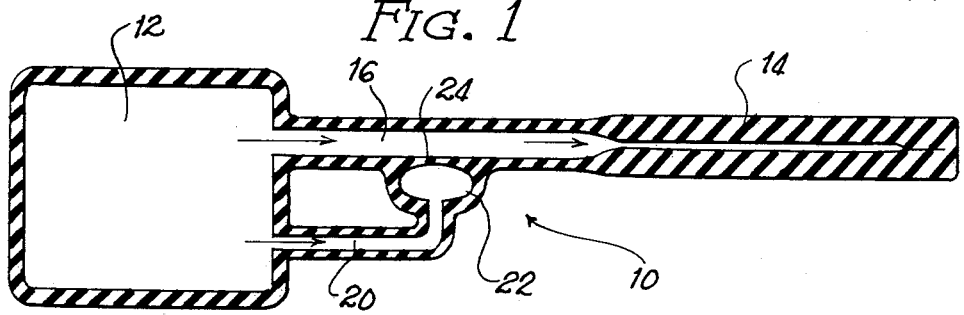
FIGURE 1 is a cross-sectional view of an energy absorbing device characterized by the features of this invention.
Figure 2:
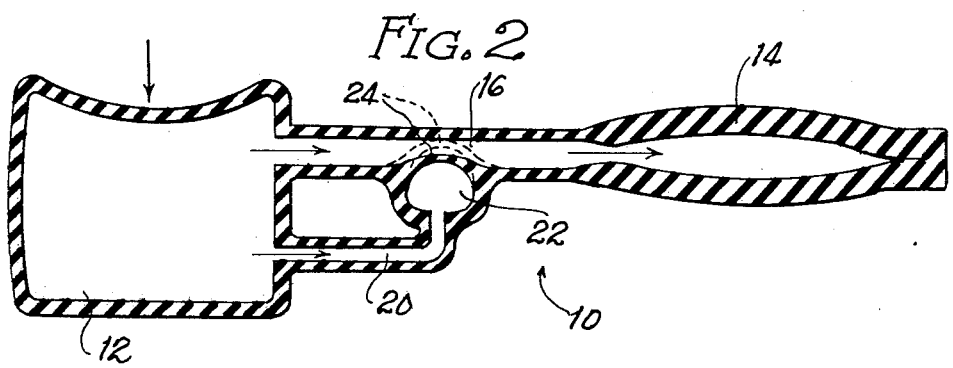
FIGURES 2 and 3 are cross-sectional views of energy absorbing devices of the type shown in FIGURE 1 in various stages of operation.
Figure 3:
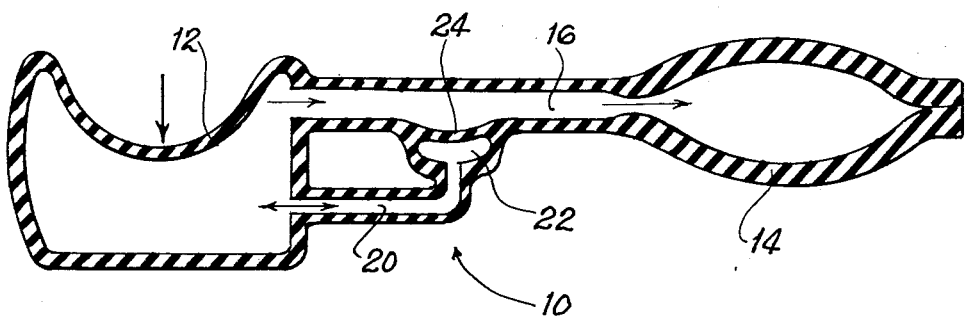

FIGURES 1 through 3 illustrate an energy absorbing device 10 which includes a first reservoir 12 and a second reservoir 14. A passage 16 is provided for interconnecting the two reservoirs. The device is formed of a suitable flexible material which is sealed, for example by gluing or heat sealing, to prevent the escape of the fluid within the device. Various plastics are available for this purpose.

The fluid within the reservoir 12 may comprise air or some other compressible fluid or a liquid, such as alcohol. If a liquid is utilized, it is important to provide a liquid with a low freezing point, particularly if the device is to be exposed to low temperature conditions. The size of the orifice to be described may be selected depending upon the fluid employed.

The device 10 is designed so that the major portion of the fluid will always be within the reservoir 12. This can be easily accomplished by manufacturing the device in the manner shown wherein the reservoir 14 is provided by portions of material located in face-to-face relationship.

When the device is subjected to a force such as indicated by the arrow in FIGURE 2, fluid in the reservoir 12 will be subjected to pressure which will cause portions of the fluid to move through the passage 16 into the reservoir 14. The improvement of this invention comprises a second passage 20 which communicates the first reservoir 12 with a small chamber 22 located adjacent the wall of the passage 16. The wall portion 24 which forms a common wall for the chamber and passage is preferably thinner than the surrounding wall portions to provide greater flexibility. When the device is subjected to impact, a portion of the fluid in the reservoir 12 will pass through the passage 20 into the chamber 22 whereby pressure is applied to the wall portion 24. This will cause the wall portion to move inwardly and thereby reduce the size of the opening through the passage 16. This will, of course, increase the work required to move the fluid into the chamber 24.

If the initial impact on the reservoir 12 is especially great, the pressure within the chamber 22 will be correspondingly high whereby the wall portion 24 could substantially completely close off the passage 16. This will maintain the fluid in the reservoir 12 for a longer period whereby a greater resistance will be provided by the reservoir 12.

In the case of a high impact, the continued application of force will gradually build up pressure in the reservoir 12 to the extent that the pressure within the chamber 22 will be overcome whereby the wall portion 24 will be forced back thereby opening the passage 16 and causing transfer of substantial fluid to the reservoir 14.

In the case of less severe impact, the flow of fluid through the passage 16 will be substantially unrestricted since a rapid build-up of high pressure in the chamber 22 will not occur. Accordingly, the device will react under low pressure conditions in substantially the same manner as it would react without the provision of the passage 20 and chamber 22. It will, therefore, be apparent that the construction of this invention incorporates differential reactions depending upon the conditions which it encounters.

Figure 5:
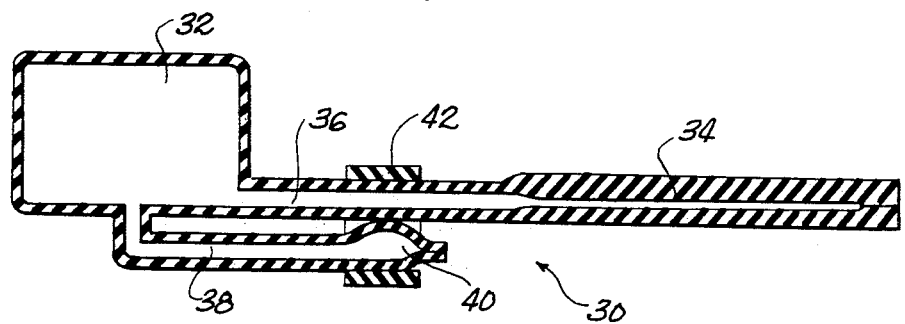
FIGURE 5 is a cross-sectional view of an alternative form of the invention.
Figure 6:
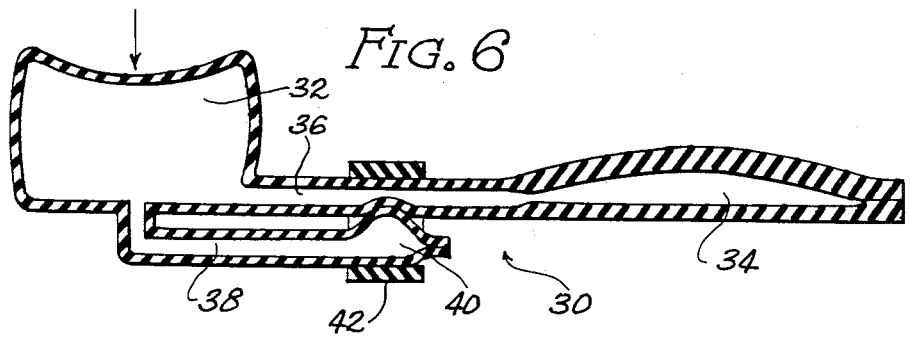
FIGURES 6 and 7 are cross-sectional views of devices of the type shown in FIGURE 5 in various stages of operation; and, FIGURE 8 is a cross-sectional view illustrating the manner in which devices characterized by the features of this invention can be associated with a helmet shell.
Figure 7:
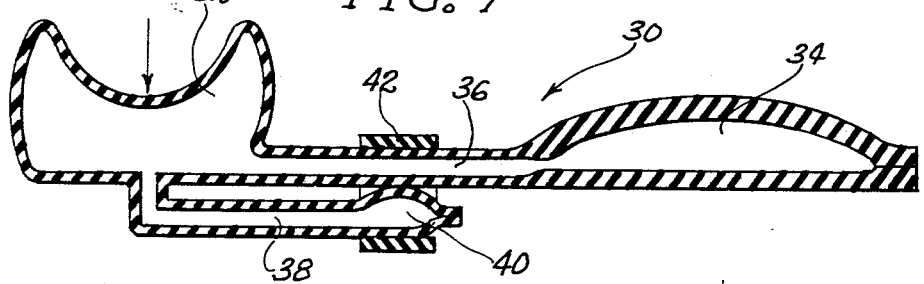

FIGURES 5 through 7 illustrate an alternative form of the invention wherein a device 30 is provided with a first reservoir 32 and a second reservoir 34. The respective reservoirs are interconnected by means of a passage 36 whereby fluid from the reservoir 32 can be delivered to the reservoir 34 when an impact force is applied.

A restricting means comprising a passage 38 and a small chamber 40 is associated with the device 30. As previously indicated, when force is applied as shown in FIGURE 6, a build-up of pressure will cause fluid to flow through the passage 38 and result in expansion of the chamber 40. In this case, the chamber 40 is held against the exterior surface of the passage 36 by means of a stiff band 42. When pressure build-up occurs, the expansion of the chamber 40 will cause constriction of the passage 36 whereby the resistance to fluid flow is increased. Accordingly, rapid depression of the reservoir 32 will not occur in the case of a high impact since the pressure within this reservoir will increase sufficiently to provide resistance to complete compression of the reservoir. As shown in FIGURE 7, the continued application of force may overcome the construction of the passage 36 at which time additional fluid will be transferred to reservoir 34. Since impact forces are only of very short duration, the applied force will be removed before complete compression can occur.

Figure 8:
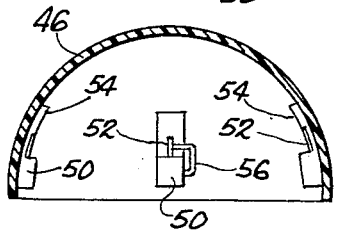

FIGURE 8 illustrates the application of devices of the type described to the interior surface of a helmet shell 46. The devices illustrated include a first reservoir 50, a connecting passage 52, and a second reservoir 54. A separate passage 56 is connected between the reservoir 50 and the passge 52 in the manner described. Obviously, the separate passages in the devices 10 and 30 should be located in a suitable position to prevent compression of these devices during compression of the reservoir.

As shown in the drawings, the walls defining the second reservoirs 14 and 34 are preferably thicker than the other walls of the device. These thicker walls are more resistant to expansion and will assist in some of the energy absorption.

It will be appreciated that other sizing and energy absorbing means may be employed along with devices of the type described. Reference is made to applicant's copending application Ser. No. 664,748 which illustrates a construction which may include devices of the type described herein. Furthermore, the principles of energy absorption are applicable to other constructions such as padding applied to dashboards of automobiles, wall padding, etc.

Figure 4:
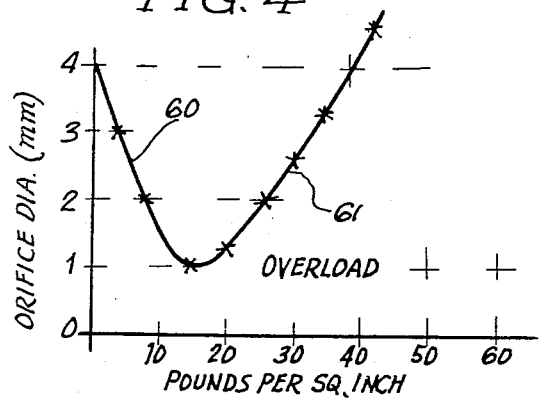
FIGURE 4 is a chart illustrating the nature of energy absorption which can be achieved in devices produced in accordance with this invention.

FIGURE 4 provides a graphic showing which will serve to illustrate the manner in which a typical device of the invention will operate to overcome the adverse affects of impact. This graph plots the orifice diameter, for example the orifice 16, against the pressure build-up within the construction.

The first portion 60 of the line indicates the conditions at the initial stages of impact. The orifice diameter is gradually reduced from 4 to 1 mm. while the pressure increases to 1.5 p.s.i. At the low point of the curve, the device is in a condition like that shown in FIGURE 2, since the orifice has become very small. As the pressure continues to increase, however, as shown by the curved portion 61, the orifice diameter begins to increase and may even exceed the original diameter as suggested by FIGURE 3.

The device described is believed to operate in three distinct ways. When lower forces are applied, the principal resistance is offered by the narrow passage 16 along with the resistance offered by the dry reservoir. As the force is increased, greater resistance is offered since the size of the passage 16 is restricted. Finally, for high impact forces, the resistance offered by restriction of the passage is overcome and the dry reservoir takes over.

It will be understood that various other changes and modifications may be made in the construction described which provide the characteristics of this invention without departing from the spirit thereof.

That which is claimed is:

1. In an energy absorbing construction wherein a first fluid reservoir is positioned for absorbing an impact whereby the reservoir is compressed, a second fluid reservoir, and first passage means connecting the first and second reservoirs whereby fluid is transferred from the first reservoir through the first passage means to the second reservoir in response to the force of the impact, the improvement comprising means associated with said passage means for restricting movement of said fluid through said passage means, said restricting means operating to vary the size of the opening through said passage means, and including means interconnecting said first reservoir and said restricting means whereby the restricting means operates in response to impact forces delivered to said first reservoir.

2. A construction in accordance with claim 1 wherein said second reservoir is normally in a compressed state whereby at least the major portion of said fluid is normally retained in said first reservoir.

3. A construction in accordance with claim 1 wherein said restricting means is connected to said first reservoir by means of a second passage means, and wherein a portion of said fluid passes through said second passage means in response to the application of said force for operating said restricting means.

4. A construction in accordance with claim 3 wherein the end of said second passage means is located immediately adjacent to said first passage means extending between said reservoirs, the build-up of pressure as a result of the application of said force causing the fluid in said second passage means to constrict the opening through said first passage means.

5. A contruction in accordance with claim 4 wherein the end of said second passage means is formed by a portion of the wall of said first passage means, said wall portion being of reduced thickness whereby pressure build-up within said second passage means causes said wall portion to expand and contrict the opening through said second passage means.

6. A construction in accordance with claim 4 wherein said second passage means extends outwardly from the wall of said first reservoir and terminates adjacent the outside surface of said first passage means, and including means for holding the end of said second passage means in position adjacent said exterior surface.

7. A construction in accordance with claim 6 wherein said first and second passage means are formed of flexible material and wherein said holding means comprises a stiff band whereby the pressure build-up in said second passage means is transmitted to the exterior surface of said first passage means to thereby constrict the opening defined by the first passage means.

8. A protective headgear comprising a shell adapted to be located on the head of a wearer, and a plurality of energy absorbing constructions of the type defined in claim 1 located on the interior surface of the shell, said energy absorbing constructions being located intermediate the head of the wearer and the interior surface of the shell.

References Cited

UNITED STATES PATENTS

| | | | |
|---|---|---|---|
| 2,115,158 | 4/1938 | Dupuy et al. | |
| 2,759,186 | 8/1956 | Dye | 2—3 |
| 3,039,109 | 6/1962 | Simpson | 2—3 |

JAMES R. BOLER, Primary Examiner

U.S. Cl. X.R.

267—65